(12) United States Patent
Battlogg et al.

(10) Patent No.: US 8,907,533 B2
(45) Date of Patent: Dec. 9, 2014

(54) DEVICE FOR PRODUCING ELECTRICAL ENERGY WITH OSCILLATING MAGNET AND COIL

(75) Inventors: Stefan Battlogg, St. Anton/Montafon (AT); Jürgen Pösel, Bludenz (AT)

(73) Assignee: Inventus Engineering GmbH, St. Anton Im Montafon (AT)

( * ) Notice: Subject to any disclaimer, the term of this patent is extended or adjusted under 35 U.S.C. 154(b) by 1499 days.

(21) Appl. No.: 12/159,669

(22) PCT Filed: Dec. 29, 2006

(86) PCT No.: PCT/AT2006/000545
§ 371 (c)(1),
(2), (4) Date: Jun. 30, 2008

(87) PCT Pub. No.: WO2007/076561
PCT Pub. Date: Jul. 12, 2007

(65) Prior Publication Data
US 2008/0303357 A1    Dec. 11, 2008

(30) Foreign Application Priority Data
Dec. 30, 2005    (AT) .............................. A 2094/2005

(51) Int. Cl.
*H02K 33/10*    (2006.01)
*H02K 35/02*    (2006.01)
*H02K 35/04*    (2006.01)

(52) U.S. Cl.
CPC ........................... *H02K 35/02* (2013.01)
USPC .................................. 310/15; 310/21; 290/53

(58) Field of Classification Search
USPC .................. 310/12.12, 15, 17, 16, 19, 20–24,
310/36–39; 290/53, 1 R; 360/105, 106;
180/165, 166, 65.31

IPC ........... H02K 41/02, 33/00, 33/10, 33/14, 35/02, H02K 35/04

See application file for complete search history.

(56) References Cited

U.S. PATENT DOCUMENTS

| | | | | |
|---|---|---|---|---|
| 3,696,251 A | * | 10/1972 | Last et al. .................... | 310/15 |
| 4,260,901 A | * | 4/1981 | Woodbridge ................. | 290/53 |
| 4,438,343 A | * | 3/1984 | Marken ........................ | 290/53 |
| 4,580,400 A | * | 4/1986 | Watabe et al. ................ | 290/53 |
| 5,347,186 A | * | 9/1994 | Konotchick .................. | 310/17 |
| 5,424,591 A | * | 6/1995 | Kuriyama ................. | 310/12.15 |
| 5,736,797 A | * | 4/1998 | Motohashi et al. ........... | 310/36 |
| 5,847,903 A | | 12/1998 | Ogawa et al. | |
| 6,592,066 B1 | | 7/2003 | Hermanns et al. | |
| 6,781,259 B2 | | 8/2004 | Hente | |
| 6,952,060 B2 | | 10/2005 | Goldner et al. | |
| 2002/0047325 A1 | | 4/2002 | Hente | |
| 2003/0034697 A1 | | 2/2003 | Goldner et al. | |
| 2005/0121915 A1 | * | 6/2005 | Leijon et al. .................. | 290/42 |

FOREIGN PATENT DOCUMENTS

| | | |
|---|---|---|
| DE | 199 60 024 A1 | 6/2000 |
| GB | 2 234 637 A | 2/1991 |
| WO | 97/30308 A2 | 8/1997 |

* cited by examiner

*Primary Examiner* — Michael Andrews
(74) *Attorney, Agent, or Firm* — Laurence A. Greenberg; Werner H. Stemer; Ralph E. Locher

(57) ABSTRACT

A device for generating electrical energy has at least one pair of permanent magnets and at least one coil. They are moved about a pivot axis relative to one another by agitating or shaking. Each coil is disposed between the pole surfaces of the at least one pair of permanent magnets which are disposed opposite each other.

18 Claims, 4 Drawing Sheets

DEVICE FOR PRODUCING ELECTRICAL ENERGY WITH OSCILLATING MAGNET AND COIL

BACKGROUND OF THE INVENTION

Field of the Invention

The invention relates to a device for producing electrical energy having at least one permanent magnet and at least one induction coil, which are moved relative to one another by shaking or vibration. Devices such as these have already been disclosed a number of times, for example in WO 97/30308 or U.S. Pat. No. 5,347,186 and are used in particular for supplying electricity to movable appliances or apparatuses which require electrical energy only occasionally, or cannot be supplied continuously. The devices contain a coil which has an axis lying in the movement direction and a permanent magnet which is moved backwards and forwards by the coil. These solutions are restricted in the dimensions of the two parts which interact with one another, since the internal coil diameter governs the cross section of the permanent magnet, with a tube on the one hand as a mount for the tongues of the coil and on the other hand as a sliding bearing for the permanent magnet, further reducing the coil cross section.

In comparison to an oscillating bearing about a pivoting axis, the sliding bearing for parts which oscillate backwards and forwards linearly is more problematic since larger bearing areas are required, resulting in larger friction areas, any lubrication is more difficult, etc. However, these criteria are governing factors in the same way as the interaction between the coil and the permanent magnet, for the energy yield. This is because restrictions to movement and poor associations etc. do not lead to small losses of a few percentage points of the energy yield, but to a massive reduction in it, in other words the device produces usable amounts of energy only in optimum conditions.

This includes the coils of the permanent magnets being designed such that they are matched as well as possible to one another, oscillation which is often possible for a very long time, in the resonant range, and, if possible, if the excitation frequency on shaking or vibration changes significantly, also the capability for matching to the changes, in order to remain in the resonant range for as long as possible, as well as the capability to vary the emission of the energy produced, since the oscillation is braked when the energy output rises.

BRIEF SUMMARY OF THE INVENTION

In order to overcome this problem, the invention now proposes that the at least one coil is arranged between the pole surfaces of at least one pair of mutually opposite permanent magnets and in that a pivoting shaft is provided about which the coil or the permanent magnet pair can be pivoted relative to one another. The first-mentioned criteria largely can be satisfied in conjunction with the arrangement of the coil between the pole surfaces of two permanent magnets, with a north pole and a south pole being opposite one another and the bearing about a pivoting shaft. The friction areas are minimized and shaft bearings can be lubricated more easily, if necessary. Furthermore, the air gap between the pole surfaces of the coil can be kept as small as possible since there need be no remaining clearance, as is essential for a linear sliding bearing. The coil which oscillates between the pole surfaces and the permanent magnets which oscillate on both sides of the coil also ensure that the turns of the coil can move at the highest possible speed through the magnetic field, and that the losses in the reversal areas remain small.

In order to achieve a compact design, one preferred embodiment provides for the coil to have a coil axis which extends at right angles to the pole surfaces.

An essentially closed magnetic flux path can be achieved in a further preferred embodiment by means of ferromagnetic parts, in particular iron caps, on which two permanent magnet pairs of different polarity are provided one behind the other.

The individual permanent magnets and the coils in one embodiment can have approximately the same dimensions so that the magnetic field changes continuously when one of the two parts is moved.

In one preferred embodiment, in which the voltage can be produced in particular by shaking by hand, the permanent magnet pairs oscillate backwards and forwards about a pivoting shaft between end stops which spring back, with the shaft extending parallel to the coil axis, and in which case two or more coils can be provided one behind the other, depending on the length of the arc, as well.

Since there are no difficulties in electrical connection of a coil which oscillates about an axis, the coil can also oscillate backwards and forwards between the end stops which spring back.

Another preferred embodiment, which can advantageously be used to produce energy by shaking, with this shaking being produced by onward movement of bodies which are fitted to the device, provides for the coil to oscillate about a pivoting shaft which extends at right angles to the coil axis. Reversal is, of course, also possible by moving the permanent magnet pair and by the coil being fixed to the housing.

The coil is preferably held on a pivoting body with side pivoting arms and oscillates between two permanent magnet pairs, which are arranged one behind the other on the arc, thus resulting in a compact design. Nevertheless, two coils can also be provided in an embodiment such as this in a simple manner by duplicating the arrangement and by providing one unit in each case, which units are diametrically opposite with respect to the pivoting shaft and each comprise an oscillating coil and two permanent magnets.

For optimization of embodiments in which the energy is produced by shaking a body which moves onward, for example, a sporting appliance or the like, end stops which spring back are generally not sufficient to maintain the oscillation at all, or to keep it in the resonant range for as long as possible. An apparatus is therefore preferably provided by means of which the springing and damping can be adjusted and which, for example, may have a leaf spring whose first end is connected to the pivoting body and whose second end is guided or held fixed to the housing. The leaf spring has a neutral, mid-position which can preferably be adjusted and acts on both sides. The connection which is fixed to the housing, in one preferred embodiment, is formed by a holding bracket or the like which can be adjusted in the longitudinal direction of the leaf spring in order to change the effective spring length. In a further embodiment an actuating motor can also be provided for this purpose and may be driven by a portion of the energy that is produced. The excess energy can preferably be stored in an energy store, for example a rechargeable battery, a capacitor or the like, and electronic control can be provided for matching and optimization.

If so-called intelligent control electronics are used, then the energy yield from the excitation frequency (shaking or vibration frequency) can be improved by continuous matching to the instantaneous excitation frequency in order at least to largely make use of the possible movement of the oscillating part, and to avoid leaving the resonant range.

The invention will now be described in more detail in the following text with reference to the figures of the attached drawing, but without being restricted to them and in which:

DESCRIPTION OF THE INVENTION

Figure 1:
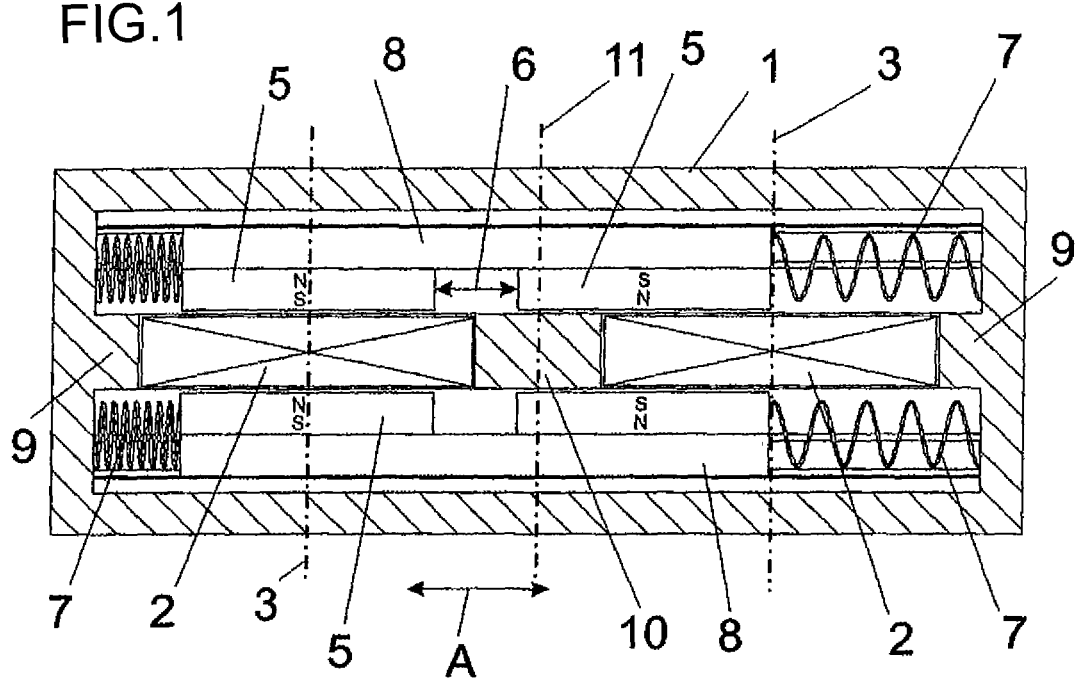
FIG. 1 shows a curved section through a first embodiment.

In a first embodiment as shown in FIG. 1, the device has a housing 1 in which at least one induction coil 2 is provided. The induction coil 2 is wound approximately at right angles and extends on the longitudinal center of the housing 1 from a rib 9, which projects inward on the end face of the housing over not quite half of it. A second induction coil 2 is provided in the same manner in the other housing half and a separating central web 10 is arranged between the two induction coils 2. Curved guide paths for permanent magnets 5, whose center of curvature lies on the axis of the shaft 11, extend on both sides of the coils 2, occupying approximately two-thirds of the guide paths and being supported towards both end faces via a helical spring 7 in each case. Overall, four permanent magnets 5 are arranged in pairs opposite one another with a north pole and a south pole in each case facing one another, although this arrangement may be inter-changed in pairs. The permanent magnets 5 are arranged on ferromagnetic parts 8 (iron caps) at a distance 6 from one another and are mounted on arms, which cannot be seen in FIG. 1, on the pivoting shaft 11. The magnetic flux produced by the four permanent magnets 5 therefore flow in an essentially closed circle without having to bridge any significant air gaps. If the housing 1 is shaken backwards and forwards in the direction of the double-headed arrow A, then, as the magnetic field moves backwards and forwards it induces a voltage in the coils 2. The stationary coils 2 can be electrically connected without any problems. Different elastic end stops could also be provided instead of the helical springs 7 that are shown, for example, also, permanent magnets with correspondingly repelling polarity. The coils 2, whose axes 3 are at right angles to the pole surfaces of the permanent magnets 5 and parallel to the pivoting shaft 11, may also surround an iron core.

The coils 2 may, of course, also be arranged such that they move and the permanent magnets 5 are fixed to the housing since, likewise, there are no problems in electrical connection of the coils 2 which can pivot about the shaft 11.

In the embodiment shown in FIGS. 2 to 6, a pivoting movement takes place about a shaft 11 which runs at right angles to the axis 3 of the coil 2. Both the permanent magnets 5 and the ferromagnetic parts 8 as well as the coil 2 are curved in the form of a circular arc. Since the coils 2 can be electrically connected via the shaft 11 in this embodiment as well, the coil 2 in FIG. 2 can move in the housing 1 and the four permanent magnets 5 are fixed to the housing. Plug-in contacts 14 are illustrated schematically in FIG. 2. The coil 2 is held on a pivoting body which oscillates backwards and forwards about the shaft 11 when shaken, via pivoting arms 12 which are arranged at the side. Spring elements 13 for the end stop which springs back are in these embodiments provided on the holders, which surround the coils 2, of the pivoting bodies. Instead of or else in addition to the spring elements 13, the pivoting arms 12 may themselves be elastic and, for example, in the form of curved leaf springs. The energy conversion is good, because the coil 2 is mounted such that it can pivot with only a small amount of friction, and, thanks to the pivoting movement, the air gap between the coils 2 and the permanent magnets 5 is minimized, thus increasing the induced voltage.

Figure 3:
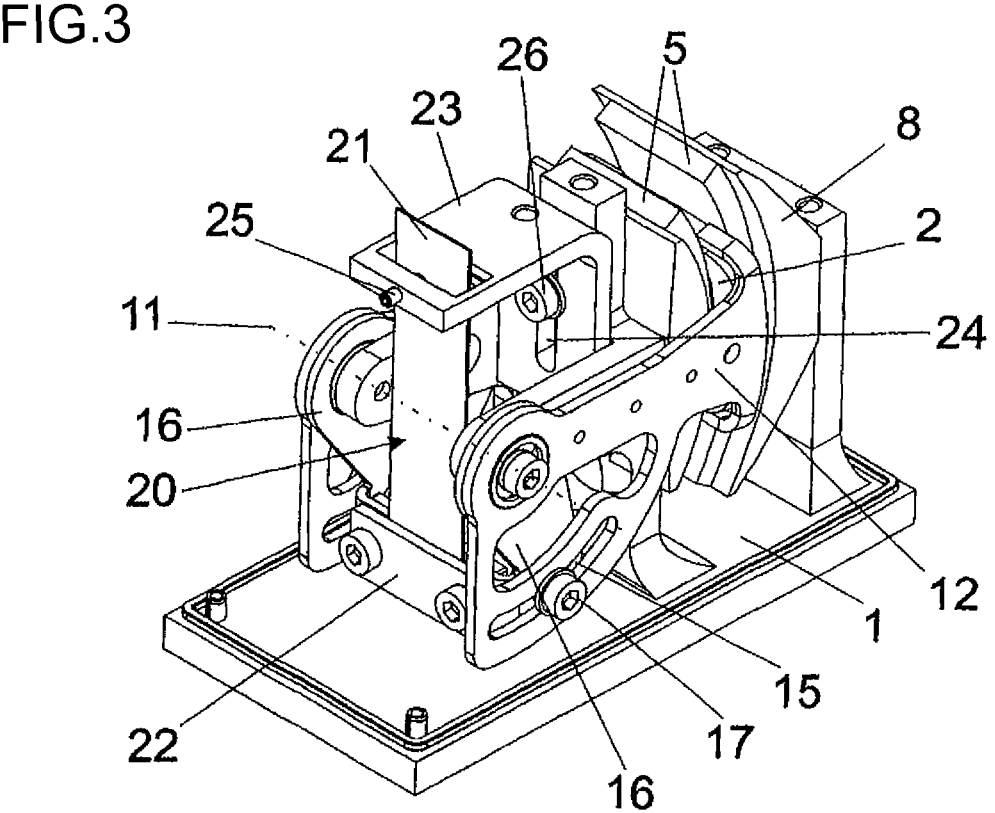
FIG. 3 shows a schematic illustration of a third embodiment.
Figure 4:
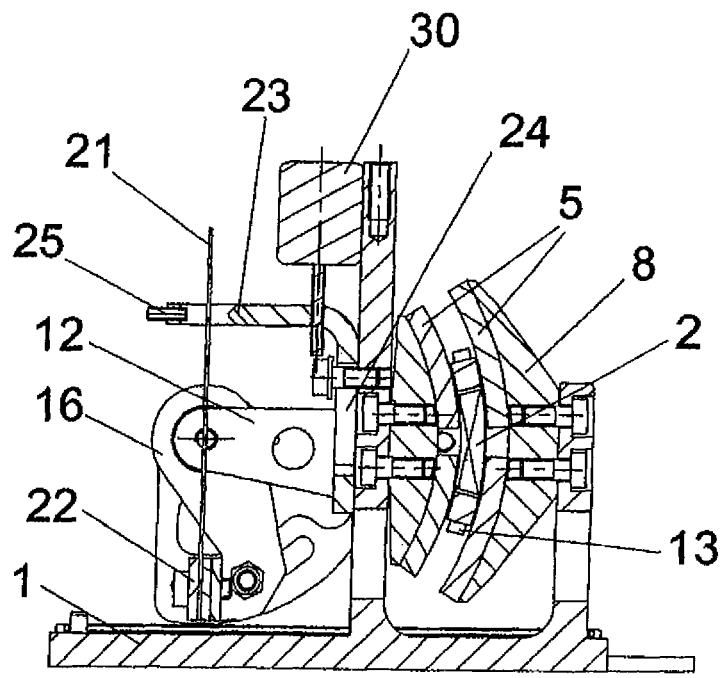
FIG. 4 shows a section through the embodiment shown in FIG. 3.
Figure 5:
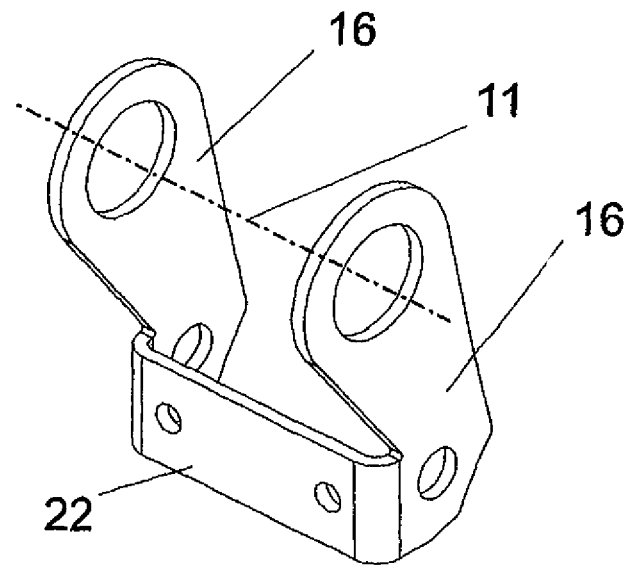
FIG. 5 shows an oblique view of a detail.

In the embodiment shown in FIGS. 3 to 5, the pivoting body, which is U-shaped or in the form of a bracket, is provided with a curved guide slot 15 on each of the side pivoting arms 12. An approximately U-shaped bracket (FIG. 5) has two side limbs 16, which are mounted on the pivoting shaft 11 and a clamping plate 22 which connects them. A fixing screw 17 which is provided in the side limb 16 passes through the guide slot 15 so that the angle between the pivoting body and the side limb 16 can be adjusted over a range of, for example, 45°, thus making it possible to adjust on the one hand the null position of the coil 2 and on the other hand also the null position of a leaf spring 21, which is fixed by the clamping plate 22 of a variable apparatus 20. At its other end, the leaf spring 21 is held loosely in a slot in a holding bracket 23 whose width can be varied by means of a screw 25. The holding bracket 23 has an elongated slot 24 through which a further adjusting screw 26 passes. The holding bracket 23 can therefore preferably be infinitely variably adjusted in the longitudinal direction of the leaf spring 21 and an adjusting screw, which is not shown in FIG. 3 or else an electrical actuating motor 30, which is shown in FIG. 4, can be used for this purpose. Some other actuating element, for example, an electromagnet, can also be used for adjustment between the two positions. The actuating motor 30 or the actuating element can be operated by the energy produced by the device and is stored, in particular, in a rechargeable battery or the like. The adjustment of the holding bracket 23 changes the distance between the clamping plate 22 and the screw 25, that is to say the effective length of the leaf spring 21, and therefore also the spring characteristics, the damping characteristics, etc. Progressive characteristics are possible with all elastic elements.

Figure 2:
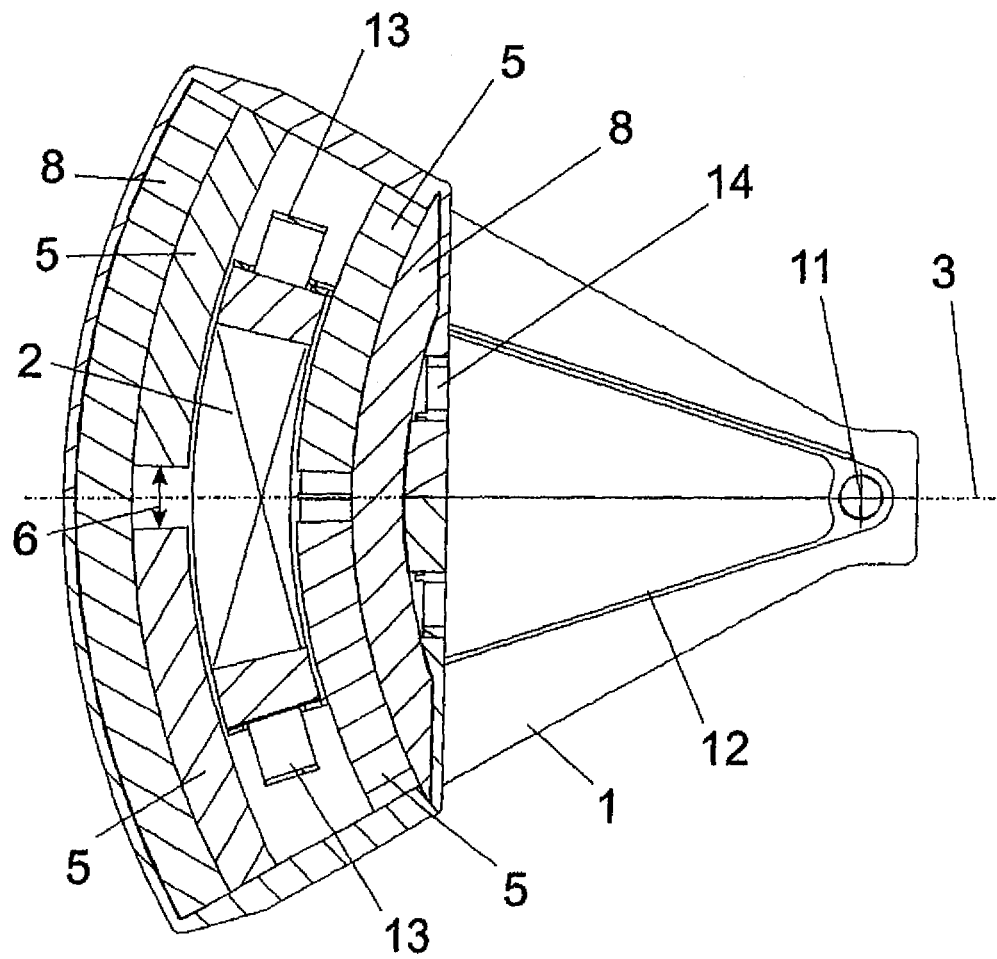
FIG. 2 shows a schematic illustration of a second embodiment, in the form of a section.
Figure 6:
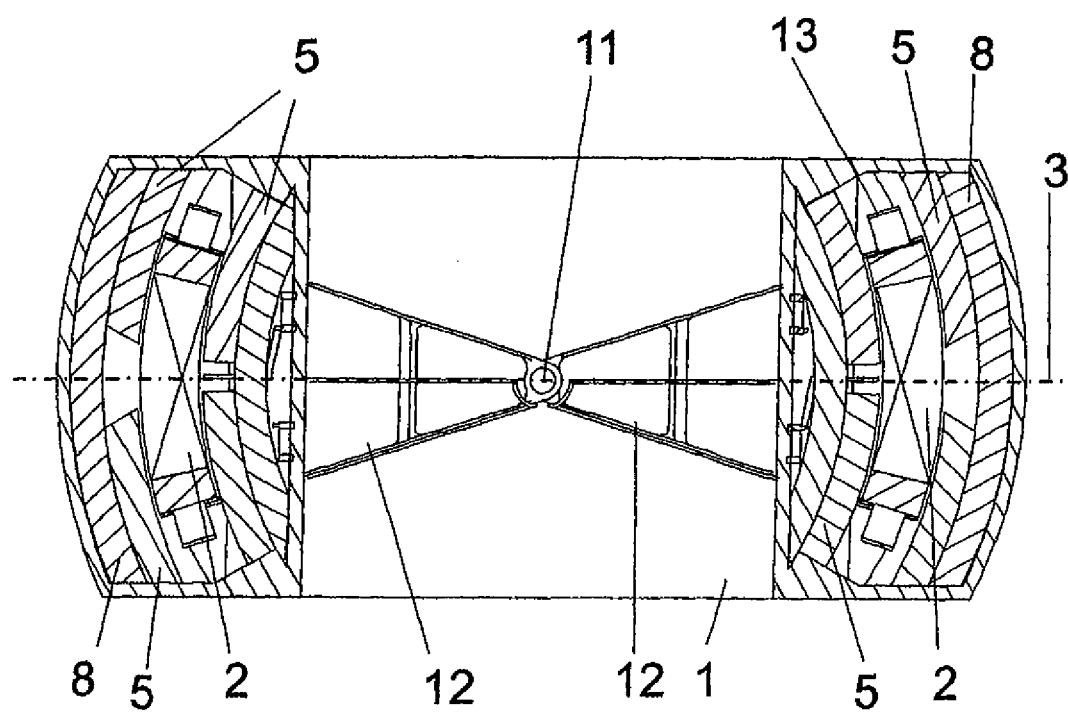
FIG. 6 shows a schematic illustration, similar to FIG. 2, of a fourth embodiment of the device according to the invention.

The embodiment shown in FIG. 6 essentially represents a duplication of the embodiment shown in FIG. 2, that is to say there are two units which each comprise an induction coil 2, which is held on one pivoting body and two pairs of permanent magnets 5, which are arranged diametrically opposite with respect to the pivoting shaft 11 and can be caused to oscillate independently of one another.

Figure 7:
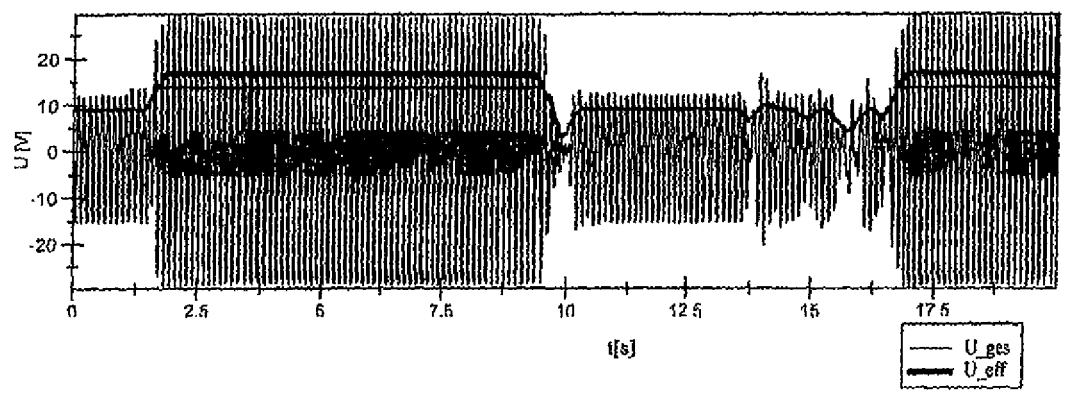
FIGS. 7 and 8 show two measurement curves with a voltage and power profile of an embodiment as shown in FIG. 3 that is excited by means of a shaking device.

The reduced friction of the part which oscillates on the pivoting shaft 11, the minimized air gap between the pole surfaces of the two permanent magnets 5 and of the coil 2 guided between them, as well as the capability to adjust the apparatus 20 allow a relatively high energy yield when oscillation in the resonant range is possible, and can be kept very largely in the resonant range by adjustment of the apparatus 10 and by influencing the energy output. FIG. 7 shows a graph of the voltage profile with a device which produces energy as shown in FIG. 3 being shaken on a shaking device over a time period of 20 seconds. The thickness of the leaf spring 21 was 1 mm and its fixed length, that is to say the distance between the clamping plate 22 and the screw 25 in the slot of the holding bracket 23 was 55 mm. The shaking device vibrated at a frequency of 8 Hz and the movement was 9 mm. As can be seen from FIG. 7, the coil 2 was influenced after the first two seconds in which the voltage U was about 11 to 12 V, by variation of the spring characteristics and the current drawn such that the oscillation of the coil 2 rose into the resonant range. In consequence the measured voltage rose to a value of virtually 30 V. After about 10 seconds, the resonance was disturbed by hand, and the voltage initially fell to a few volts, before rising again, thanks to the uniform excitation oscillation of the shaking device, to the initial value of about 12 V. Another impulse after about 17 seconds once again led to resonant oscillation with a high voltage of about 30 V.

Figure 8:
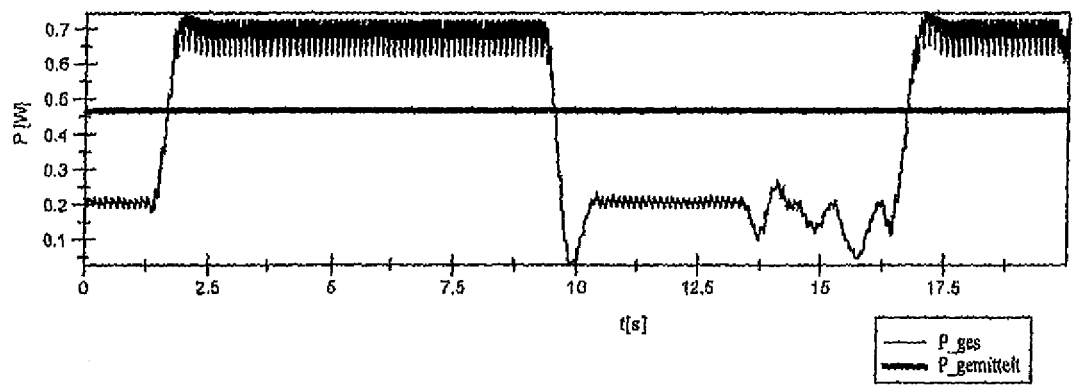

FIG. 8 shows the corresponding measurement curve for the power P which can be output, in watts. In this case as well, the transfer of oscillation into the resonant range results in a considerable gain in power, specifically from about 0.2 W to about 0.7 W.

When the shaking of a body which moves onward, for example of a sporting appliance, such as a ski or the like is intended to be used for producing energy, uniform excitation and relatively long maintenance of resonant oscillation are improbable. So-called intelligent electronics, which are not shown in the figures, can improve the energy yield by readjusting or adapting the natural frequency of the oscillating part continuously to the instantaneous excitation frequency which is detected by means of at least one sensor, thus as far as possible ensuring that the resonant range is not left, or is achieved again as quickly as possible. To do this, it is also important to reduce the load resistance, that is to say the current output, if the oscillation is braked such that it threatens to fall out of the resonant range, and to vary the spring length of the leaf spring 21 in order to influence the spring stiffness.

The resonance, that is to say the increase in oscillation, if the excitation frequency approaches the natural frequency can, in many cases, be avoided. In contrast, in the case of the device according to the invention, it is desirable since it improves the energy yield by a large factor.

The invention claimed is:

1. A device for generating electrical energy, comprising:
   at least one permanent magnet having a magnetic field;
   at least one coil disposed in the magnetic field of said permanent magnet;
   wherein at least one of said magnet or said coil is mounted for free oscillation relative to one another induced by the shaking or vibration of the device; and
   wherein the shaking or vibration of the device causes said magnet and said coil to be displaced together with the device and induces an oscillation between said permanent magnet and said coil independently of, and decoupled from, the movement of the device for generating electrical energy.

2. The device according to claim 1, wherein said at least one coil has a coil axis extending orthogonally to said pole surfaces.

3. The device according to claim 1, wherein said permanent magnets are provided with ferromagnetic parts.

4. The device according to claim 3, wherein two permanent magnets are disposed one behind the other on each ferromagnetic part.

5. The device according to claim 1, wherein said magnet is one of a pair of permanent magnets disposed to oscillate about a pivot axis defined by a pivoting shaft extending parallel to a coil axis of said coil.

6. The device according to claim 1, wherein said coil is disposed to oscillate about a pivot axis defined by a pivoting shaft extending orthogonally to a coil axis of said coil.

7. The device according to claim 6, wherein said coil is held on a pivoting body with side pivoting arms.

8. The device according to claim 7, wherein each said pivoting arm is a leaf spring.

9. The device according to claim 8, wherein said leaf spring forming said pivoting arm defines an elastic element of an apparatus for adjusting a springing and/or damping of the respectively oscillating part of the device.

10. The device according to claim 7, which comprises a leaf spring with a first end connected to the pivoting body and a second end associated with a holding bracket that is adjustable in a longitudinal direction of said leaf spring.

11. The device according to claim 10, wherein said holding bracket has an actuated motor operated by electrical energy generated by the device.

12. The device according to claim 1, which comprises two units disposed diametrically opposite with respect to said pivot axis, each of said units including a respective said coil and two permanent magnet pairs.

13. The device according to claim 1, which comprises an elastic element disposed to act on both sides from a neutral mid-position.

14. The device according to claim 13, wherein the mid-position is adjustable.

15. The device according to claim 1, which further comprises an apparatus for adjusting a springing and/or damping of the free oscillation between said magnet and said coil.

16. The device according to claim 1, which further comprises an electronic control for optimizing an energy supply.

17. A device for generating electrical energy from induced shaking or vibration, comprising:
   at least one stationary coil;
   a shaft defining a pivot axis;
   at least one permanent magnet mounted to said shaft for pivoting about said pivot axis; and
   a spring device disposed to adjust a free resonance of a pivoting movement of said magnet relative to said coil, and to spring and/or damp the pivoting about said pivot axis substantially independently of the induced shaking or vibration.

18. The device according to claim 17, wherein said at least one permanent magnet is one of a pair of magnets having pole surfaces disposed opposite one another and embracing said at least one stationary coil, wherein an oscillating motion of said permanent magnets relative to said coil generates electrical energy.

* * * * *